United States Patent [19]

Tanaka

[11] Patent Number: 4,870,436
[45] Date of Patent: Sep. 26, 1989

[54] CLOSE-UP PHOTOGRAPHING DEVICE

[75] Inventor: Osamu Tanaka, Osaka, Japan

[73] Assignee: Minolta Camera Kabushiki Kaisha, Osaka, Japan

[21] Appl. No.: 151,694

[22] Filed: Feb. 2, 1988

[30] Foreign Application Priority Data

Feb. 2, 1987 [JP] Japan .................................. 62-23221

[51] Int. Cl.$^4$ .............................................. G03B 3/02
[52] U.S. Cl. .................................................. 354/195.1
[58] Field of Search ............................. 354/195.1, 400

[56] References Cited

U.S. PATENT DOCUMENTS 3,408,145  10/1968  Walzberg ............................. 354/400

*Primary Examiner*—Michael L. Gellner
*Attorney, Agent, or Firm*—Price, Gess, & Ubell

[57] ABSTRACT

A close-up photographing device wherein, once a focused or a near focused condition is reached, it can be maintained irrespective of changing of the photographing magnification, and a photographing procedure can be simplified. The device includes first and second mounting members having a photographing optical system and a film mounted thereon, respectively, a third mounting member on which the first and second mounting members are mounted for movement in a direction of the optical axis of the optical system, and a manually operable magnification changing member having first and second means for controlling movement of the first and second mounting members, respectively, relative to the third mounting member. By manual operation of the magnification changing member, the first and second mounting members are moved simultaneously relative to the third mounting member to change the magnification while maintaining a focused condition or a near focused condition.

4 Claims, 5 Drawing Sheets

CLOSE-UP PHOTOGRAPHING DEVICE

BACKGROUND OF THE INVENTION

1. Field of the Invention

This invention relates to a device for taking a close-up photograph.

2. Description of the Prior Art

An exemplary one of conventional devices for taking a close-up photograph is a bellows. Thus, at first a conventional bellows will be described.

Referring to FIG. 8 which illustratively shows a manner of close-up photographing using a bellows, a camera body 51 contains therein a film 52 on which an image of an object 54 is to be recorded. The camera body 51 is mounted on a camera mounting frame 56 which is in turn mounted at an end 55a of a bellows 55. A close-up lens 53 is mounted on a lens mounting frame 57 which is in turn mounted at the other end 55b of the bellows 55. The lens mounting frame 57 and the camera mounting frame 56 are supported on a rial 58 for mutually independent movement in a direction of the optical axis of the lens 53, and the rail 58 is supported on a focusing rail 59 for movement in a direction along the optical axis of the lens 53.

Now, a procedure of close-up photographing will be described. At first, knobs 56a and 57a are manually operated to move the lens mounting frame 57 and the camera mounting frame 56 independently of each other along the rail 58 to adjust the length of the bellows 55 and hence the distance between the lens 53 and the film 52 to set a magnification for photographing. Then, a further knob 59a is manually operated to move the rail 58 along the focusing rail 59 thereby to move the lens 53 and the camera body 51 in an integral relationship to adjust the distance from the object 54 to the lens 53 and the film 52 until a focused condition or a near focused condition in which an image of the object 54 can be confirmed on a face of the film 52 is reached. After a near focused condition has been reached, a focusing mechanism not shown incorporated in the lens 53 is manually operated to reach a focused condition. Once the focused condition is reached, a release operation is effected on the camera body 51 side to start exposure.

By the way, such a condition frequently occurs wherein, although a focused condition is reached, either the magnification is so high that an image of an object protrudes from a photographing area of a film or the set magnification is so low that the magnification must be re-set. Or otherwise, it is sometimes desired to take a plurality of photographs with different magnifications. In such cases, changing of the magnification will cancel a focused condition on such a conventional device as shown in FIG. 8. Accordingly, each time the magnifying factor is changed, a focusing operation must be effected again, which complicates a photographing procedure. Besides, in case even a near focused condition is canceled, an image of an object cannot be confirmed. Accordingly, setting of a composition is very difficult on the conventional close-up photographing device.

SUMMARY OF THE INVENTION

It is an object of the present invention to provide a close-up photographing device wherein, once a focused condition or a near focused condition is reached, the focused or near focused condition can be maintained irrespective of changing of the magnification and a photographing procedure can be simplified.

In order to attain the object, according to one aspect of the present invention, there is provided a close-up photographing device which comprises a first mounting member for mounting a photographing optical system thereon, a second mounting member for mounting thereon a record face providing element having a record face on which an image of an object is to be recorded, a third mounting member for mounting thereon the first and second mounting members for movement in a direction of the optical axis of the optical system and in a separated relationship from the object, and a manually operable magnification changing member having formed thereon a first cam groove for controlling movement of the first mounting member relative to the third mounting member and a second cam groove for controlling movement of the second mounting member relative to the third mounting member, the first and second cam grooves being so shaped as to allow changing of the photographing magnification while maintaining a focused condition or a near focused condition wherein an image of the object can be confirmed on the record face.

With the close-up photographing device, if the manually operable magnification changing member is manually operated, the first and second mounting members will be moved simultaneously relative to the third mounting member along the first and second cam grooves, respectively, formed on the magnification changing member to change the photographing magnification while maintaining a focused condition or a near focused condition.

Accordingly, since the photographing magnification can be changed while maintaining a focused condition or a near focused condition wherein an image of an object can be confirmed on the record face, there is an effect that there is no necessity of effecting a focusing operation each time the magnification is changed, and accordingly a photographing procedure can be extremely simplified. Another effect can also be anticipated that the photographing magnification can be changed while an image of an object is kept confirmed, and accordingly there is no need of repetition of magnification changing operations by several times and setting of a composition can be facilitated significantly.

According to another aspect of the present invention, there is provided a close-up photographing device which comprises a first mounting member for mounting a photographing optical system thereon, a second mounting member for mounting thereon a record face providing element having a record face on which an image of an object is to be recorded, a third mounting member for mounting thereon the first and second mounting members for movement in a direction of the optical axis of the optical system, and a manually operable magnification changing member for causing changing of the photographing magnification while maintaining a focused condition or a near focused condition wherein an image of the object can be confirmed on the record face, the magnification changing member including a first gear for controlling movement of the first mounting member relative to the third mounting member and a second gear for controlling movement of the second mounting member relative to the third mounting member.

With the close-up photographing device, if the manually operated, the first and second mounting members will be moved simultaneously relative to the third mounting member by way of the first and second gears, respectively, provided on the magnification changing member to change the photographing magnification while maintaining a focused condition or a near focused condition.

Accordingly, similar effects to those described above can also be anticipated.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
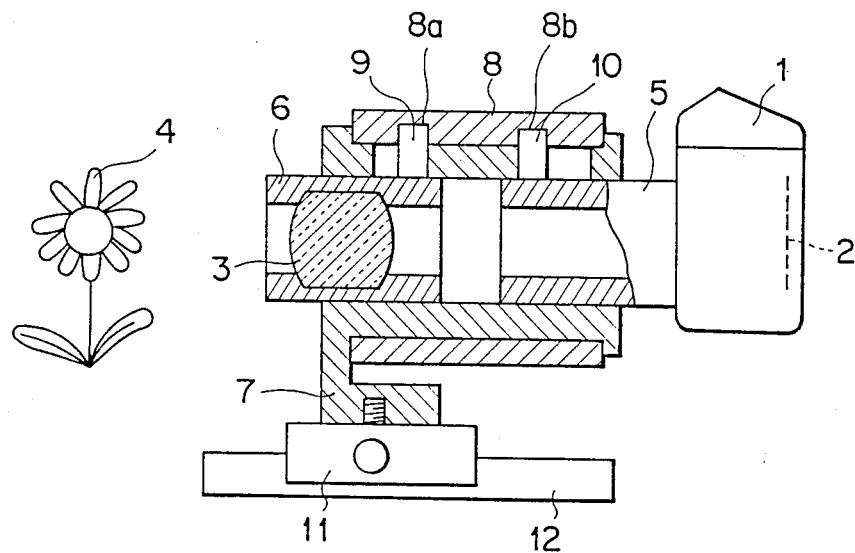
FIG. 1 is an illustrative view, partly in section, showing a manner of close-up photographing using a close-up photographing device of a first preferred embodiment of the present invention.

Referring first to FIG. 1 which illustratively shows a manner of close-up photographing using a close-up photographing device to which the present invention is applied, a camera body 1 contains therein a film 2 on which an image of an object 4 is to be recorded. The film 2 has a surface which serves as a record face. The camera body 1 is mounted on a body mounting cylinder 5 which serves as a lens mount and a second mounting member. A lens 3 which serves as a photographing optical system is mounted on a lens mounting cylinder 6 which serves as a first mounting member. The body mounting cylinder 5 and the lens mounting cylinder 6 are mounted for movement in a direction of the optical axis of the lens 3, that is, in leftward and rightward directions in FIG. 1 on a fixed cylinder 7 which serves as a third mounting member. The fixed cylinder 7 is secured to a movable member 11 by a suitable means such as a fastening screw, and the movable member 11 is mounted for movement on a rail 12. A magnification setting ring 8 is provided on the fixed cylinder 7 and serves as a manually operable magnification changing member for moving the lens mounting cylinder 6 and the body mounting cylinder 5. A pair of cam grooves 8a and 8b are formed on an inner circumferential wall of the magnification setting ring 8, and a pin 9 provided on the lens mounting cylinder 6 is received in the cam groove 8a while another pin 10 provided on the body mounting cylinder 6 is received in the other cam groove 8b. The cam grooves 8a and 8b are so shaped that the lens mounting cylinder 6 and the body mounting cylinder 5 may be moved while maintaining a focused condition as hereinafter described.

Now, a photographing procedure using the close-up photographing device will be described. At first, the magnification setting ring 8 will be rotated around the optical axis. Thereupon, the pins 9 and 10 are moved in a direction of the optical axis along the cam grooves 8a and 8b, respectively, of the magnification setting ring 8. Consequently, the distance between the lens 3 and the film 2 and hence the magnification are changed. After setting of a desired magnification in this manner, the movable member 11 will be moved along the rail 12 to move the fixed cylinder 7 relative to the rail 12. By such movement, the distances of the lens 3 and the film 2 from the object 4 are adjusted to reach a focused condition. After a focused condition is reached, a release operation is effected on the camera body 1 side to start photographing.

Figure 8:
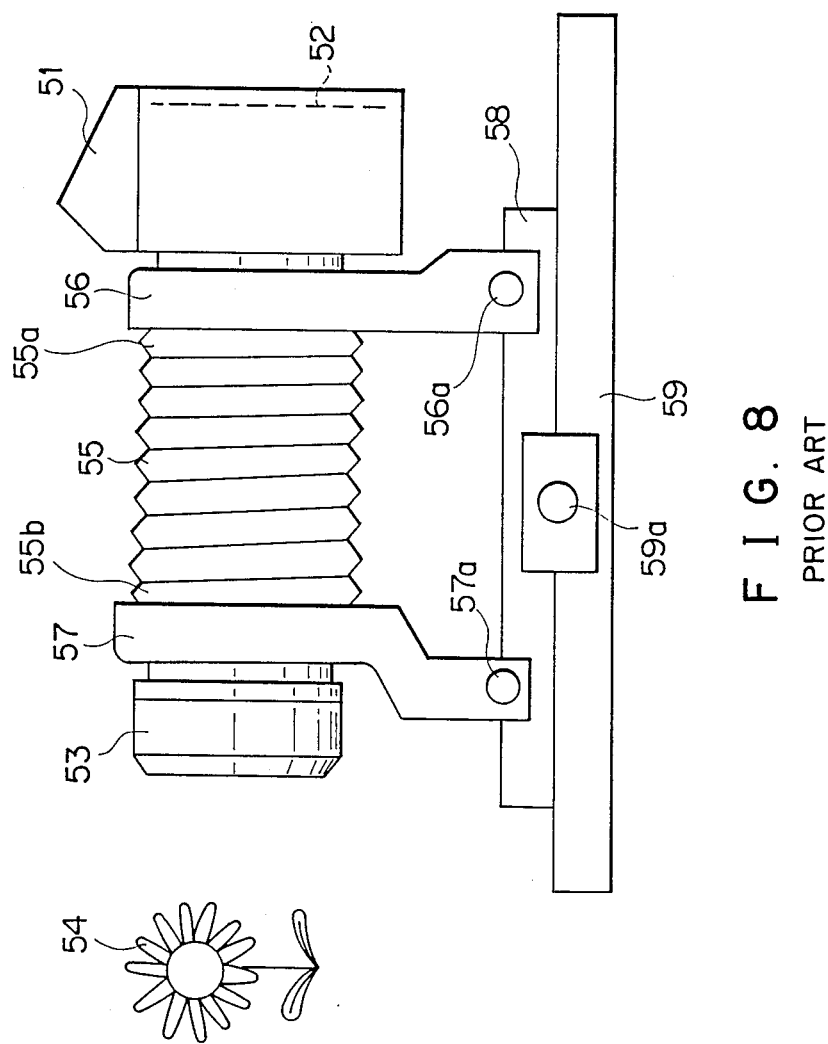
FIG. 8 is an illustrative view, partly in section, showing a manner of close-up photographing using a conventional close-up photographing device.

Here, an examination is made of a case wherein it becomes necessary to re-set a magnification after a focused condition has been reached. In such a case, the magnification setting ring 8 will be rotated to re-set a magnification. In this instance, rotation of the magnification setting ring 8 will cause simultaneous movement of the lens mounting cylinder 6 and the body mounting cylinder 5 to change the magnification while maintaining the focused condition. Accordingly, with the close-up photographing device, only an operation to change the magnification is required, and there is no need of performing a further focusing operation as in the conventional close-up photographing device of FIG. 8. Further, since a focused condition once reached is maintained, the magnification can be changed while an image of the object 4 is continuously confirmed through a viewfinder not shown of the camera body 1. Accordingly, setting of a composition is significantly facilitated. Thus, there is no necessity of repetition of magnification changing operations and focusing operations by several times.

Figure 2:
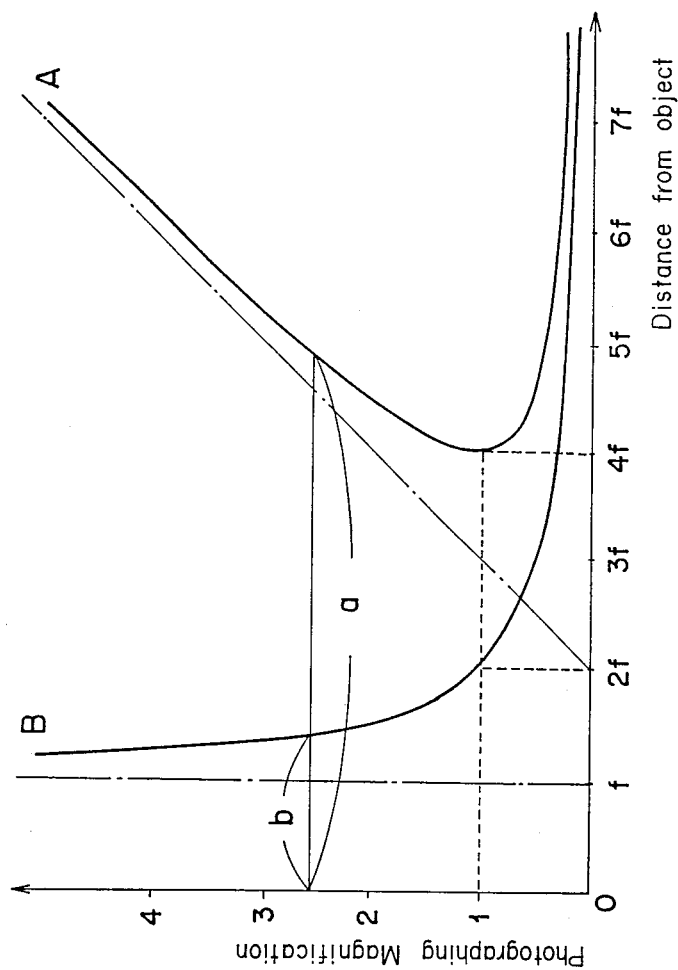
FIG. 2 is a graph showing a relation of a photographing magnification to positions of an optical system and a record face relative to an object.

Now, the shapes or configurations of the cam grooves 8a and 8b will be described. Referring to FIG. 2, there is shown a graph illustrating relations in a focused condition of the photographing magnification M to the positions of the lens 3 and the film 2, that is, the image forming plane, with respect to the object 4. In FIG. 2, curves A and B represent positions or distances of the film 2 and the lens 3, respectively, from the object 4. Meanwhile, long and short dash lines in FIG. 2 indicate asymptotic lines to the curves A and B. The axis of abscissa of the graph represents the distance from the object 4 and the character f represents the focal length of the lens 3 while the axis of ordinate represents the photographing magnification M. The distance a between the object 4 and the film 2 and the distance b between the object 4 and the lens 3 are represented by following equations (1) and (2), respectively, as well known in the art.

$$a = \left(M + \frac{1}{M} + 2\right)f \quad (1)$$

$$b = \left(\frac{1}{M} + 1\right)f \quad (2)$$

In particular, the curve A meets the relation of the equation (1) while the curve B meets the relation of the equation (2) above. As apparently seen from the graph, in the case of photographing with an equal magnification of 1, the distances between the film 2 and the lens 3 and between the lens 3 and the object 4 should each be set to $2f$, and in the case of photographing with a higher magnification, the lens 3 should be advanced to a point spaced by a distance equal to f from the object 4 (b→f) and the film 2 should be moved away from the object 4 and also from the lens 3 (a→∞) while in the case of photographing with a lower magnification, the lens 3 and the film 2 should be moved away from the object 4 (a, b→∞) and toward each other (a-b→f). (From the equations (1) and (2) above, b−a=(M+1) f→f (M→0)).

Accordingly, if the film 2 and the lens 3 are moved simultaneously in accordance with the curves A and B, respectively, in a direction to increase or decrease the magnification, the magnification can be changed while maintaining a focused condition. Therefore, the cam grooves 8b and 8a should be shaped in accordance with the curves A and B, respectively.

It is to be noted that the magnification changing operation need not necessarily be effected by operation of the magnification setting ring 8 and may otherwise be effected, for example, by movement of the lens mounting cylinder 6 in the direction of the optical axis of the lens 3 involving a following movement of the ring 8 and the body mounting cylinder 5, or else by movement of the body mounting cylinder 5 in the direction of the optical axis involving a following movement of the ring 8 and the lens mounting cylinder 6.

Figure 3:
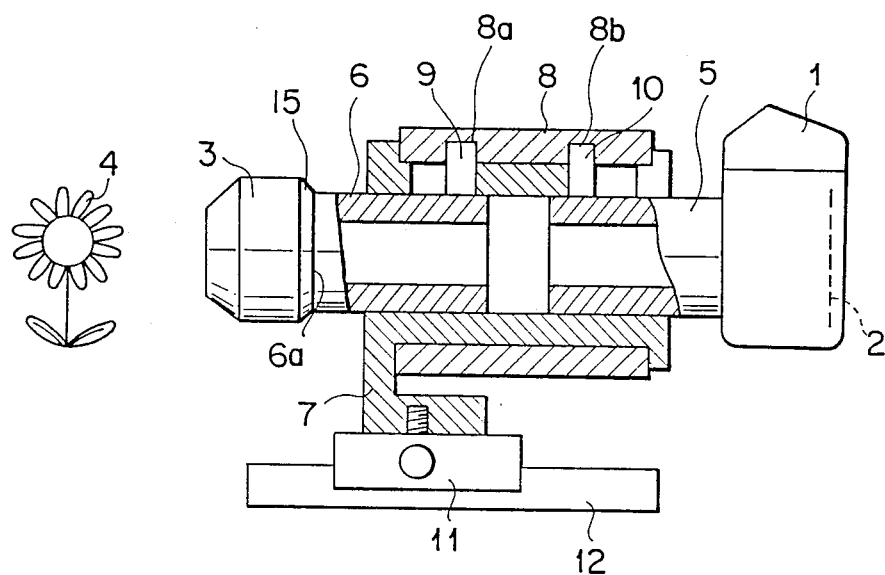
FIG. 3 is an illustrative view, partly in section, showing a manner of close-up photographing using a close-up photographing device of a second preferred embodiment of the present invention.

Subsequently, a second preferred embodiment of the present invention will be described with reference to FIG. 3. It is to be noted that like parts or elements are denoted by like reference numerals to those of the first embodiment of FIG. 1 and this also applies to each of the following embodiments hereinafter described. The close-up photographing device of the embodiment of FIG. 3 includes a lens mount 15 provided at an end 6a of a lens mounting cylinder 6 for mounting a lens 3 thereon. Accordingly, any lens which has a focal length conforming to cam grooves 8a and 8b formed on a magnification setting ring 8 can be used as the lens 3. Construction of the remaining portion of the close-up photographing device is similar to that of the first embodiment, and overlapping description thereof is omitted herein to avoid redundancy.

Figure 4:
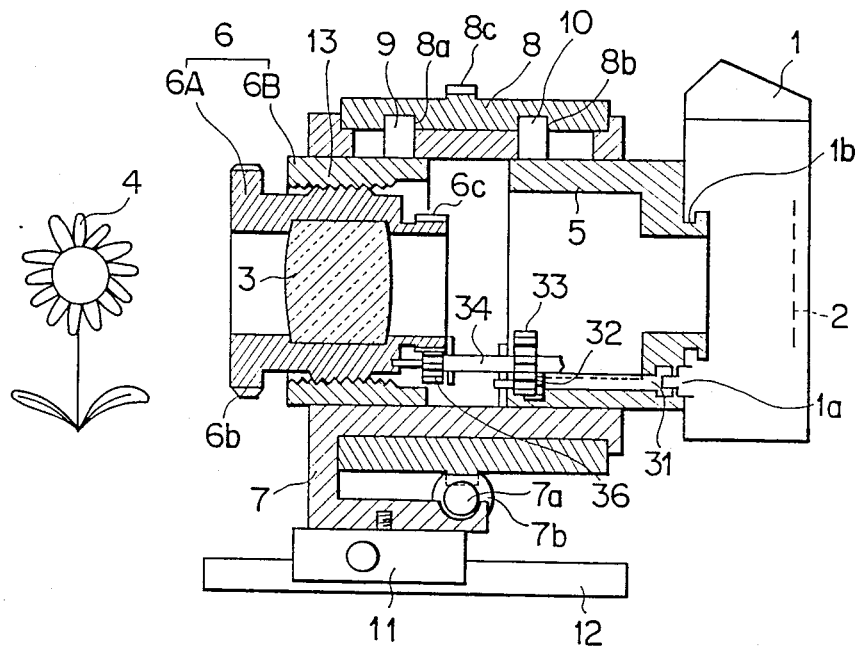
FIG. 4 is a similar view but showing a manner of close-up photographing using a close-up photographing device of a third preferred embodiment of the present invention.

Referring now to FIG. 4, a third preferred embodiment of the present invention will be described. The close-up photographing device of the embodiment is a modification to the close-up photographing device of the first embodiment shown in FIG. 1 in that it has an automatic focusing function. Similarly as in the first embodiment, a camera body 1 contains a film 2 therein and is mounted on a body mounting cylinder 5 by means of a lens mount 1b, and a lens 3 serving as a photographing optical system is mounted on a lens mounting cylinder 6. The body mounting cylinder 5 and the lens mounting cylinder 6 are mounted on a fixed cylinder 7 for movement in a direction of the optical axis of the lens 3, that is, in a leftward or rightward direction, and the fixed cylinder 7 is securely supported on a movable member 11 by a suitable fixing means such as a screw. The movable member 11 is mounted for movement on a rail 12. A pin 10 is provided on the body mounting cylinder 5 while another pin 9 is provided on the lens mounting cylinder 6, and the pins 10 and 9 are received in cam grooves 8b and 8a, respectively, formed on a magnification setting ring 8. The cam grooves 8a and 8b are so shaped as to provide movement of the lens mounting cylinder 6 and the body mounting cylinder 5, respectively, while maintaining a focused condition in a similar manner as in the first embodiment described hereinabove. A series of teeth 8c are formed around an outer periphery of a longitudinal central portion of the magnification setting ring 8 and are partially held in meshing engagement with a worm gear 7a mounted for rotation on the fixed cylinder 7. A manually operable magnification changing knob 7b is mounted in a coaxial relationship at an end of the worm gear 7a. The lens mounting cylinder 6 consists of a part 6A on which the lens 3 is mounted and another part 6B mounted on the fixed cylinder 7, and the two parts 6A and 6B are coupled to each other by way of a fine focusing mechanism 13. The fine focusing mechanism 13 may be constituted from cooperating screw threads as seen in FIG. 4 or from a lead groove and a cooperating pin, from a cam groove and a cam follower pin for converting a rotational motion of the part A into a linear motion which cooperate to cause, when the part 6A is rotated around the optical axis, the part 6A to move in a direction of the optical axis relative to the part 6B. The aforementioned pin 9 is formed on the part 6B of the lens mounting cylinder 6. The part 6A serves as a focusing member and has a manually operable portion 6b formed at a forward end portion thereof for effecting manual focusing therewith and has formed at a rear end portion thereof a gear 6c for receiving thereat an output of an automatic focusing (AF) coupler 1a on the camera body 1 side when automatic focusing is to be effected.

Figure 5:
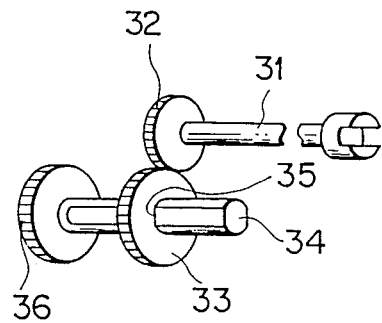
FIG. 5 is a perspective view showing an automatic focusing mechanism which is employed in the close-up photographing device of the third embodiment shown in FIG. 4.

Now, a mechanism for transmitting an output of the AF coupler 1a on the body 1 side will be described with reference to FIG. 5. The mechanism includes an AF coupler 31 on the close-up photographing mechanism side. The AF coupler 31 is designed for engagement with the body side AF coupler 1a which is driven in response to an output of a known focused condition detecting device not shown incorporated in the body 1. The close-up photographing mechanism side AF coupler 31 has an interlocking gear 32 at an end portion thereof on the object side. The close-up photographing mechanism side AF coupler 31 is mounted in the body mounting cylinder 5 such that it can rotate relative to the body mounting cylinder 5 but is held from movement in a direction of the optical axis in the body mounting cylinder 5. Another interlocking gear 33 is held in meshing engagement with the interlocking gear 32. The interlocking gear 33 is also held from movement in a direction of the optical axis within the body mounting cylinder 5. Further, the gear 33 has an oval or angular hole 35 formed therein through which a shaft 34 having a cross section of a shape similar to the shape of the hole 35 extends so that the gear 33 may not rotate relative to the shaft 34 but can slidably move in an axial direction along the shaft 34. A gear 36 is formed in an integral relationship at an end portion of the shaft 34 on the object side and is supported on the lens mounting cylinder 6 such that it can be rotated relative to the lens mounting cylinder 6 but is held from movement in a direction of the optical axis in the lens mounting cylinder 6. The gear 36 is held in meshing engagement with another gear 6c formed on the lens mounting cylinder 6. It is to be noted that the member 7a interconnecting the magnification setting ring 8 and the knob 7b need not necessarily be a worm gear and may otherwise be any mechanism which changes the orientation of the axis of rotation such as a mechanism of cooperating bevel gears. Further, the magnification may otherwise be changed by operation of such a magnification setting ring 8 as provided in the first embodiment described above without employing the knob 7b, worm gear 7a and gear 8c of the present embodiment.

Now, a photographing procedure using the close-up photographing device will be described. Referring to FIG. 4, if the manually operable magnification changing knob 7b is rotated, rotation of the knot 7b is transmitted to the magnification setting ring 8 via the worm gear 7a and the gear 8c to rotate the ring 8. Thereupon, the pins 9 and 10 are moved in a direction of the optical axis along the cam grooves 8a and 8b, respectively, in a similar manner as in the first embodiment. Consequently, the lens mounting cylinder 6 and the body mounting cylinder 5 are also moved in the direction of the optical axis. In this instance, the shaft 34 slides in the hole 35 formed in the gear 33 in the direction of the optical axis. As a result, the distance between the lens 3 and the film 2 and hence the photographing magnification are changed. After setting of a desired magnification in this manner, the movable member 11 will be manually operated to move the fixed cylinder 7 relative to the focusing rail 12. By such movement of the fixed cylinder 7, the distances from the object 4 to the lens 3 and the film 2 are adjusted to reach a focused condition or a near focused condition. In case a near focused condition is reached, either the fine focusing mechanism 13 is manually operated or an automatic focusing mechanism is rendered operative in order to reach a focused condition. After a focused condition is reached, a release operation is effected to start exposure. When it is desired to change the magnification, only the knob 7b must be operated and accordingly there is no need of effecting a focusing operation again similarly as in the first embodiment described above.

Here, description will be given of a fine focusing operation which is a characteristic of the present embodiment. At first, manual focusing will be described. If a change-over member not shown on the body 1 side will be set to the manual side, connection between the AF couplers 1a and 31 is canceled by a mechanism not shown. Accordingly, the close-up photographing mechanism side AF coupler 31 is released to allow free movement of the focusing member 6A of the lens mounting cylinder 6. Thus, if the manually operable part 6b is operated, that is, rotated around the optical axis, the lens 3 is moved in a direction of the optical axis by the fine focusing mechanism 13 so that a focused condition can be reached.

To the contrary, when it is intended to effect automatic focusing, the change-over member on the body 1 side will be set to the automatic side. As a result, the AF couplers 1a and 31 are connected to each other by a mechanism not shown. If an AF switch not shown is turned on while the camera is in a near focused condition, the AF coupler 1a on the body 1 side is rotated by a motor not shown incorporated in the body 1 until a focused condition is detected by the focused condition detecting device not shown. Such rotation of the AF coupler 1a is transmitted to the close-up photographing mechanism side AF coupler 31 so that the focusing member 6A is rotated around the optical axis by way of the gears 32, 33, 36 and 6c. Consequently, the lens 3 is moved in a direction of the optical axis by the fine focusing mechanism 13 to reach a focused condition. With such an automatic focusing function as described above, fine focusing operation can be effected very readily, rapidly and accurately.

By the way, in photographing with a high magnification (of, for example, $M \geq 3$), since the positions of the lens 3 and the film 2 vary substantially linearly with respect to a change of the photographing magnification M as apparently seen from FIG. 2, a near focused condition may be maintained if the lens mounting cylinder 6 and the body mounting cylinder 5 are moved linearly using a lead groove or a helicoid screw instead of the cam grooves 8a and 8b. However, in such a case, indeed the positions of the lens 3 and the film 2 vary substantially linearly with respect to a change of the magnification, but strictly speaking, they vary non-linearly. Accordingly, if the lens mounting cylinder 6 and the body mounting cylinder 5 are moved linearly with respect to the fixed cylinder 7 by means of a lead groove or the like, a focused condition will be canceled. Therefore, the fine focusing mechanism 13 becomes necessary. Thus, by provision of an automatic focusing function as in the present embodiment, a fine focusing operation can be effected very readily, rapidly and accurately.

Figure 6:
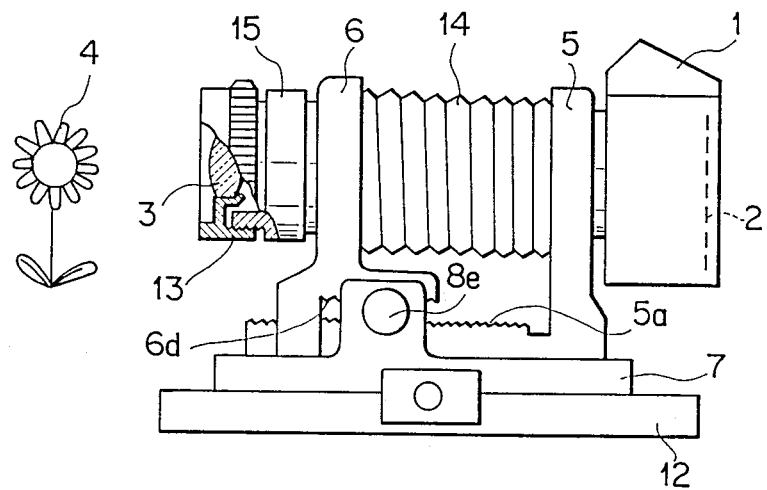
FIG. 6 is an illustrative view, partly in section, showing a manner of close-up photographing using a close-up photographing device of a fourth preferred embodiment of the present invention.
Figure 7:
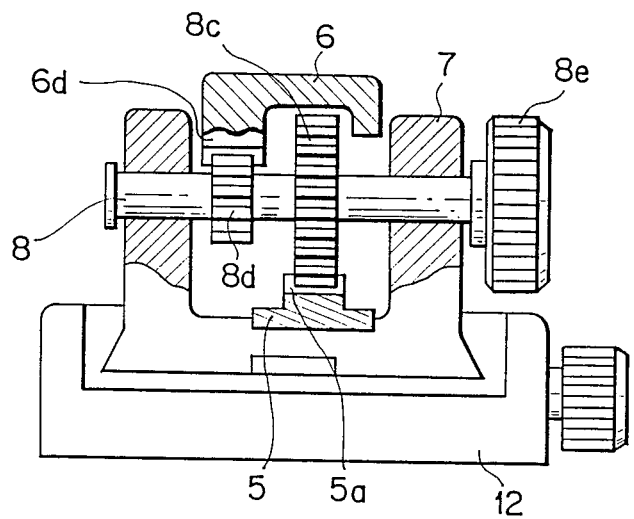
FIG. 7 is a partial enlarged view of the close-up photographing device of FIG. 6.

Now, a fourth preferred embodiment of the present invention will be described with reference to FIGS. 6 and 7. The close-up photographing device of the present embodiment is designed for use in photographing with a high magnification (three times or more) and includes such a bellows 14 of the conventional close-up photographing device of FIG. 8 mounted between a body mounting frame 5 which serves as a second mounting member and a lens mounting frame 6 which serves as a first mounting member. Teeth are formed at bar-like portions 5a and 6d of the body mounting frame 5 and the lens mounting frame 6 and serve as racks. A shaft 8 which serves as a manually operable magnification changing member is supported for rotation on a third mounting member 7, and a circular knob 8e is mounted at an end of the shaft 8 while a pair of gears 8c and 8d are mounted at intermediate portions of the shaft 8 and held in meshing engagement with the racks 5a and 6d, respectively. The gears 8c and 8d individually serve as pinions. The ratio in diameter between the pinions 8c and 8d is equal to a ratio in absolute value of an increasing amount in the direction of the axis of abscissa relative to an increasing amount in the direction of the axis of ordinate of straight lines which are approximated to portions of the curves A and B in FIG. 2 in the high magnification region ($M \geq 3$), that is, reciprocal numbers to the slopes of the straight lines. By means of the racks and pinions, the body mounting frame 5 and the lens mounting frame 6 are moved in mutually opposite directions along the optical axis of the lens 3. Further, a fine focusing mechanism 13 is provided on a lens barrel on which the lens 3 is mounted. Construction of the remaining part of the close-up photographing device is similar to that of the second embodiment described above.

As apparently seen from FIG. 2, in the high magnification region (M≧3), the position of the film 2 and the lens 3 varies linearly relative to a change of the photographing magnification. Therefore, even if the body mounting frame 5 and the lens mounting frame 6 are moved always at equal rates relative to rotation of the knob 8c to change the photographing magnification, a focused condition is almost maintained. In other words, even if the two frames 5 and 6 are rotated by means of the racks and pinions, a near focused condition is maintained. Then, in case a focused condition is canceled and a near focused condition is entered, the fine focusing mechanism 13 will be manually operated until a focused condition is reached.

It is to be noted that since the magnification changing operation in the present embodiment is effected not by rotation of a magnification setting ring around the optical axis of the lens as in the first and second embodiments but by rotation of the circular knob around the center axis of the same, magnification changing operation can be effected with promoted readiness.

By the way, while the foregoing description has been given only of close-up photographing, it is otherwise possible to employ a lens of a long focal length as a photographing optical system and use a photographing device of the present invention either for standard photographing or use as a zoom lens which is used for tele-photographing. In this case, however, it will be used only within a low magnification region (of, for example, M≦0.1) because the distance between the first and second mounting members is great.

Having now fully described the invention, it will be apparent to one of ordinary skill in the art that many changes and modifications can be made thereto without departing from the spirit and scope of the invention as set forth herein.

What is claimed is:

1. A close-up photographing device, comprising:
   a first mounting member for mounting a photographing optical system thereon including means for providing a fine focusing function to enable the operator to achieve a final focus condition from a near focus condition;
   a second mounting member for mounting thereon a record face providing element having a record face on which an image of an object is to be recorded;
   a third mounting member for mounting thereon said first and second mounting members for movement in a direction of the optical axis of said optical system and in a separated relationship from the object;
   a manually operable magnification changing member having formed thereon a first cam groove for controlling movement of said first mounting member relative to said third mounting member and a second cam groove for controlling movement of said second mounting member relative to said third mounting member, said first and second cam grooves being so shaped as to allow changing of the photographing magnification while maintaining a focused condition or a near focused condition wherein an image of the object can be confirmed on said record face, and
   a holding means for holding thereon said first mounting member, said second mounting member, said third mounting member and said manually operable magnification changing member to provide a complete assembly of said device independent of an object to be photographed.

2. A close-up photographing device as claimed in claim 2, wherein said record face providing element is a film contained in a camera body which is removably mounted on said second mounting member, and said fine focusing mechanism is automatically driven in response to an output of a focused condition detecting device installed in said camera body.

3. A close-up photographing device, comprising:
   a first mounting member for mounting a photographing optical system thereon including means for providing a fine focusing function to enable the operator to achieve a final focus condition from a near focus condition;
   a second mounting member for mounting thereon a record face providing element having a record face on which an image of an object is to be recorded;
   a third mounting member for mounting thereon said first and second mounting members for movement in a direction of the optical axis of said optical system;
   a manually operable magnification changing member for causing changing of the photographing magnification while maintaining a focused condition or a near focused condition wherein an image of the object can be confirmed on said record face, said magnification changing member including a first gear for controlling movement of said first mounting member relative to said third mounting member and a second mounting member relative to said third mounting member, and
   a holding means for holding thereon said first mounting member, said second mounting member, said third mounting member and said manually operable magnification changing member to provide a complete assembly of said device independent of an object to be photographed.

4. A close-up photographing lens assembly, comprising:
   a first mounting member for mounting a photographing optical system thereon including means for providing a fine focusing function to enable the operator to achieve a final focus condition from a near focus condition;
   a second mounting member for mounting thereon a film member to record an image of an object;
   a third mounting member for mounting thereon said first and second mounting members for movement along an optical axis of said optical system,
   an operable magnification changing member having formed thereon a first member for controlling movement of said first mounting member relative to said third mounting member and a second member for controlling movement of said second mounting member relative to said third mounting member, said first and second members allowing changing of the photographing magnification while maintaining a focused condition or a near focused condition wherein an image of the object can be recorded on said film member, and
   a holding means for holding thereon said first mounting member, said second mounting member, said third mounting member and said manually operable magnification changing member to provide a complete assembly of said device independent of an object to be photographed.

* * * * *